US00RE43781E

(19) United States
(12) Reissued Patent
Yoshino

(10) Patent Number: US RE43,781 E
(45) Date of Reissued Patent: Nov. 6, 2012

(54) VACUUM TRANSFER ROBOT

(75) Inventor: Takahiro Yoshino, Chigasaki (JP)

(73) Assignee: Ulvac, Inc., Chigasaki-shi, Kanagawa (JP)

(21) Appl. No.: 29/409,392

(22) Filed: Dec. 22, 2011

Related U.S. Patent Documents

Reissue of:
(64) Patent No.: Des. 639,323
Issued: Jun. 7, 2011
Appl. No.: 29/361,139
Filed: May 6, 2010

(30) Foreign Application Priority Data

Nov. 17, 2009 (JP) ..... 2009-026910

(51) LOC (9) Cl. ..... 15-09
(52) U.S. Cl. ..... D15/199; D13/182
(58) Field of Classification Search ..... D13/182; D15/199; 74/479.01, 490.01, 490.05; 134/110; 198/346.2; 361/234; 396/611; 414/217, 414/331.15, 411, 416.03, 744.1, 744.2, 744.3, 414/744.5, 935, 937, 939, 941; 438/14
See application file for complete search history.

(56) References Cited

U.S. PATENT DOCUMENTS

| | | | | | |
|---|---|---|---|---|---|
| D323,332 | S | * | 1/1992 | Ishii et al. | D15/199 |
| 6,102,649 | A | * | 8/2000 | Ogawa et al. | 414/744.5 |
| 6,109,860 | A | * | 8/2000 | Ogawa et al. | 414/744.5 |
| 6,155,131 | A | * | 12/2000 | Suwa et al. | 74/490.05 |
| 6,190,114 | B1 | * | 2/2001 | Ogawa et al. | 414/744.5 |
| 6,364,599 | B1 | * | 4/2002 | Suwa et al. | 414/744.1 |
| RE37,731 | E | * | 6/2002 | Ogawa et al. | 74/490.01 |
| 7,056,080 | B2 | * | 6/2006 | Ogawa et al. | 414/744.5 |
| 7,114,907 | B2 | * | 10/2006 | Ogawa et al. | 414/744.5 |
| D552,138 | S | * | 10/2007 | Kondo et al. | D15/199 |

(Continued)

*Primary Examiner* — Patricia Palasik
(74) *Attorney, Agent, or Firm* — Harness, Dickey & Pierce, P.L.C

(57) CLAIM

The ornamental design for a vacuum transfer robot, as shown and described.

DESCRIPTION

FIG. 1 is a front, top and right side perspective view of a vacuum transfer robot showing our new design with all arms in a folded state;
FIG. 2 is a front elevational view thereof shown in FIG. 1;
FIG. 3 is a rear elevational view thereof shown in FIG. 1;
FIG. 4 is a top plan view thereof shown in FIG. 1;
FIG. 5 is a bottom plan view thereof shown in FIG. 1;
FIG. 6 is a right side elevational view thereof shown in FIG. 1;
FIG. 7 is a left side elevational view thereof shown in FIG. 1;
FIG. 8 is a front, top and right side perspective view of the vacuum transfer robot with the upper arms in an extended state;
FIG. 9 is a front elevational view thereof shown in FIG. 8;
FIG. 10 is a rear elevational view thereof shown in FIG. 8;
FIG. 11 is a top plan view thereof shown in FIG. 8;
FIG. 12 is a bottom plan view thereof shown in FIG. 8;
FIG. 13 is a right side elevational view thereof shown in FIG. 8; and,
FIG. 14 is a left side elevational view thereof shown in FIG. 8.

1 Claim, 14 Drawing Sheets

Figure 1:
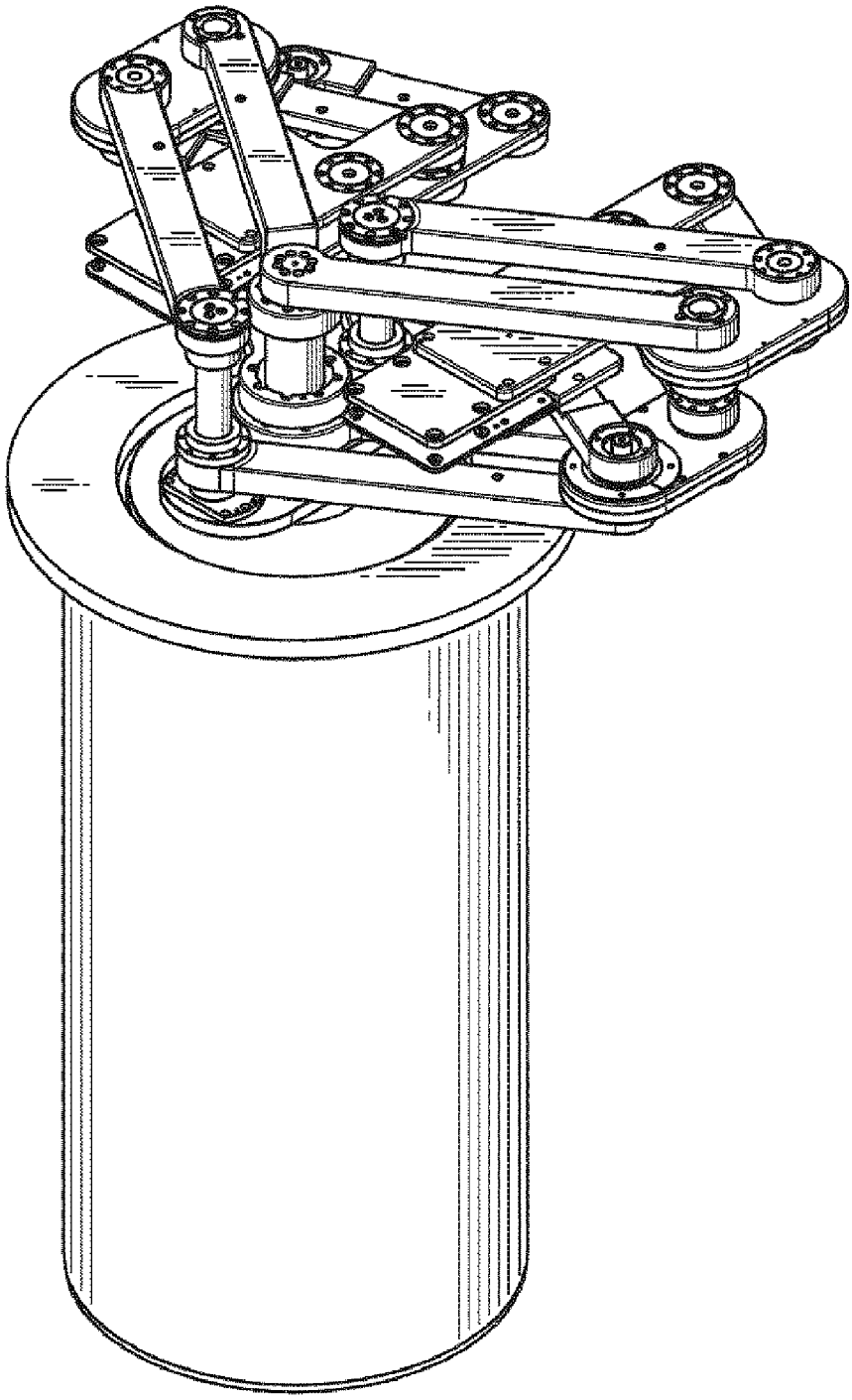
Figure 2:
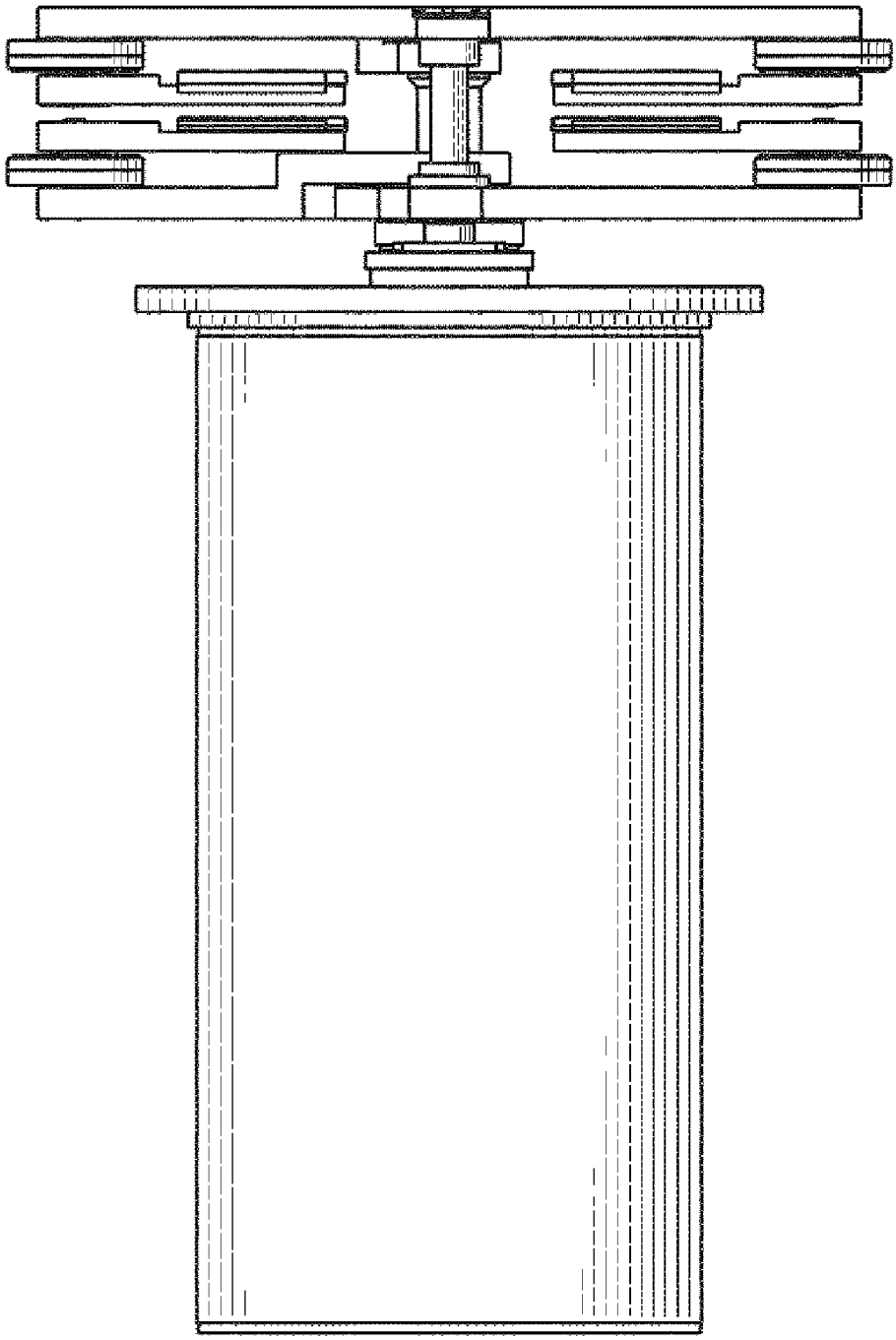
Figure 3:
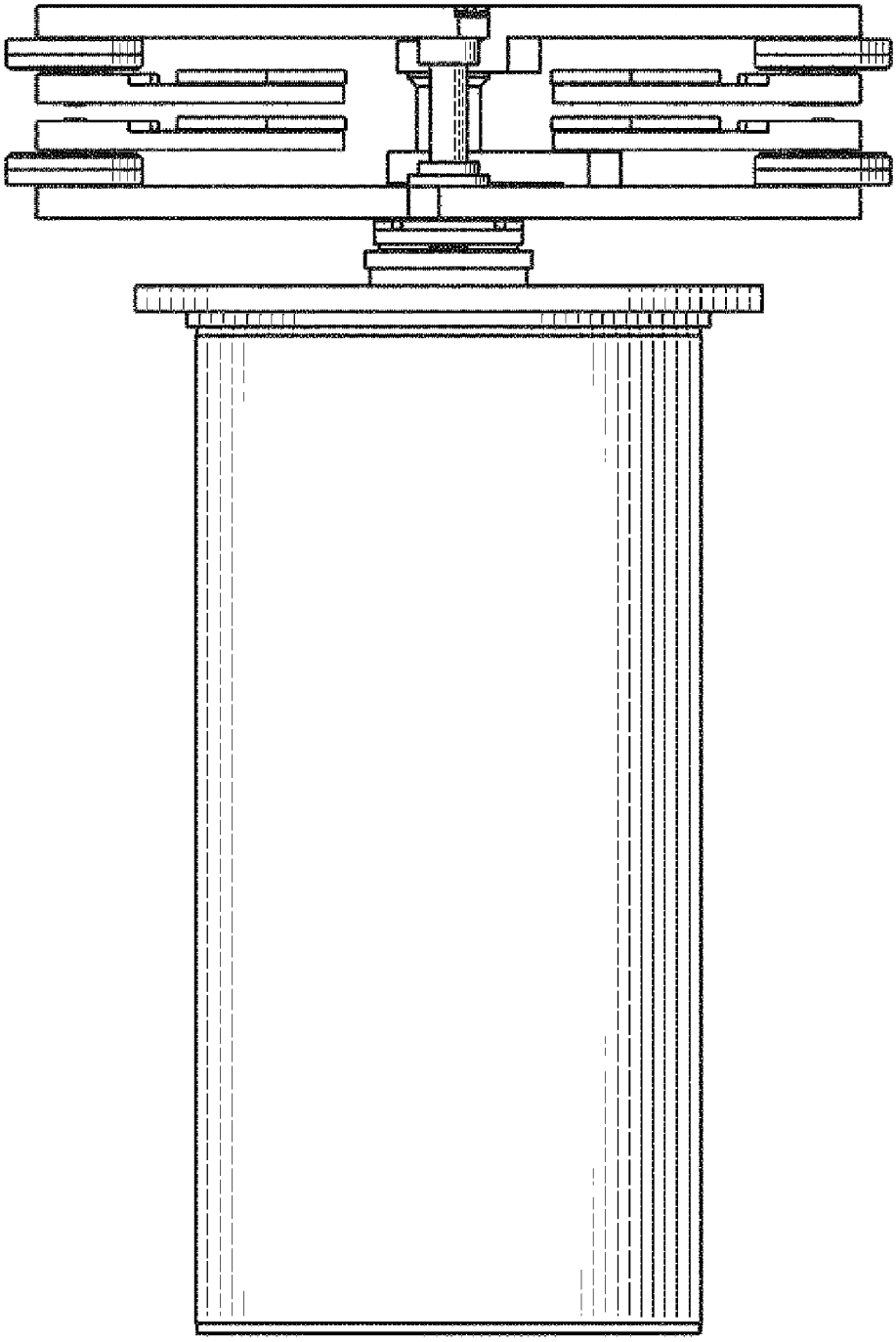
Figure 4:
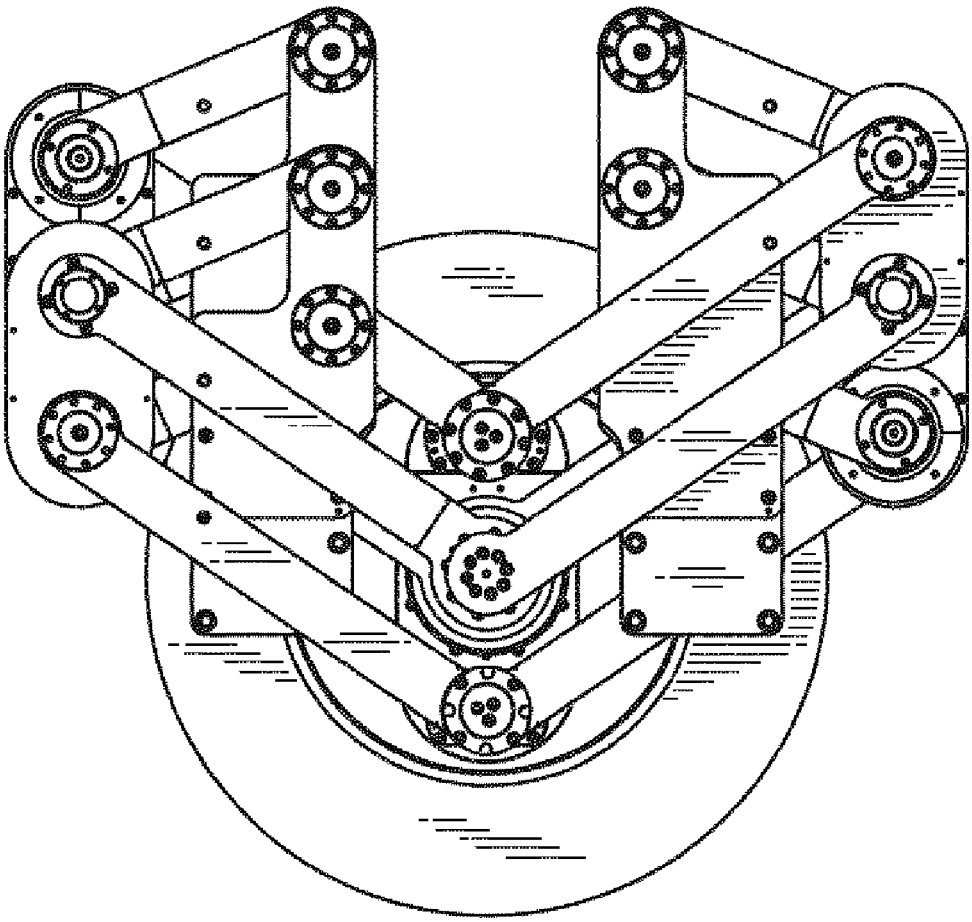
Figure 5:
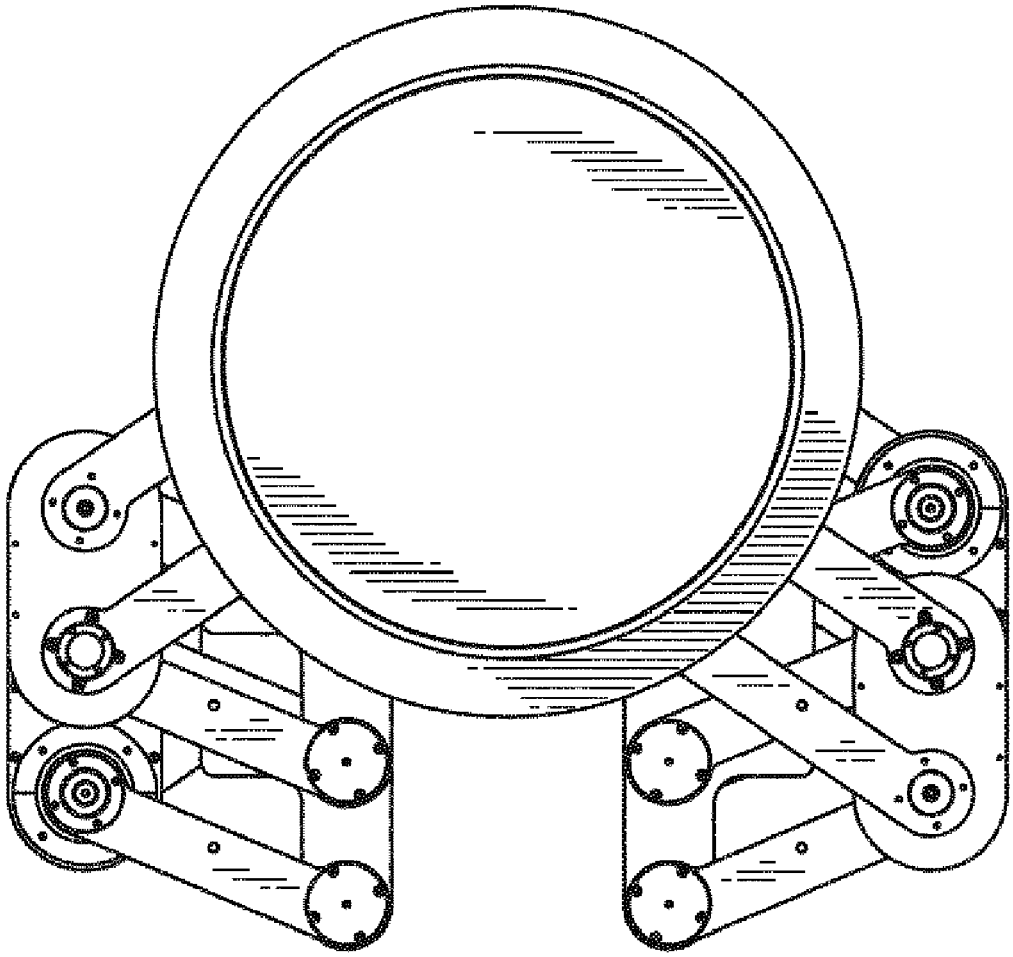
Figure 6:
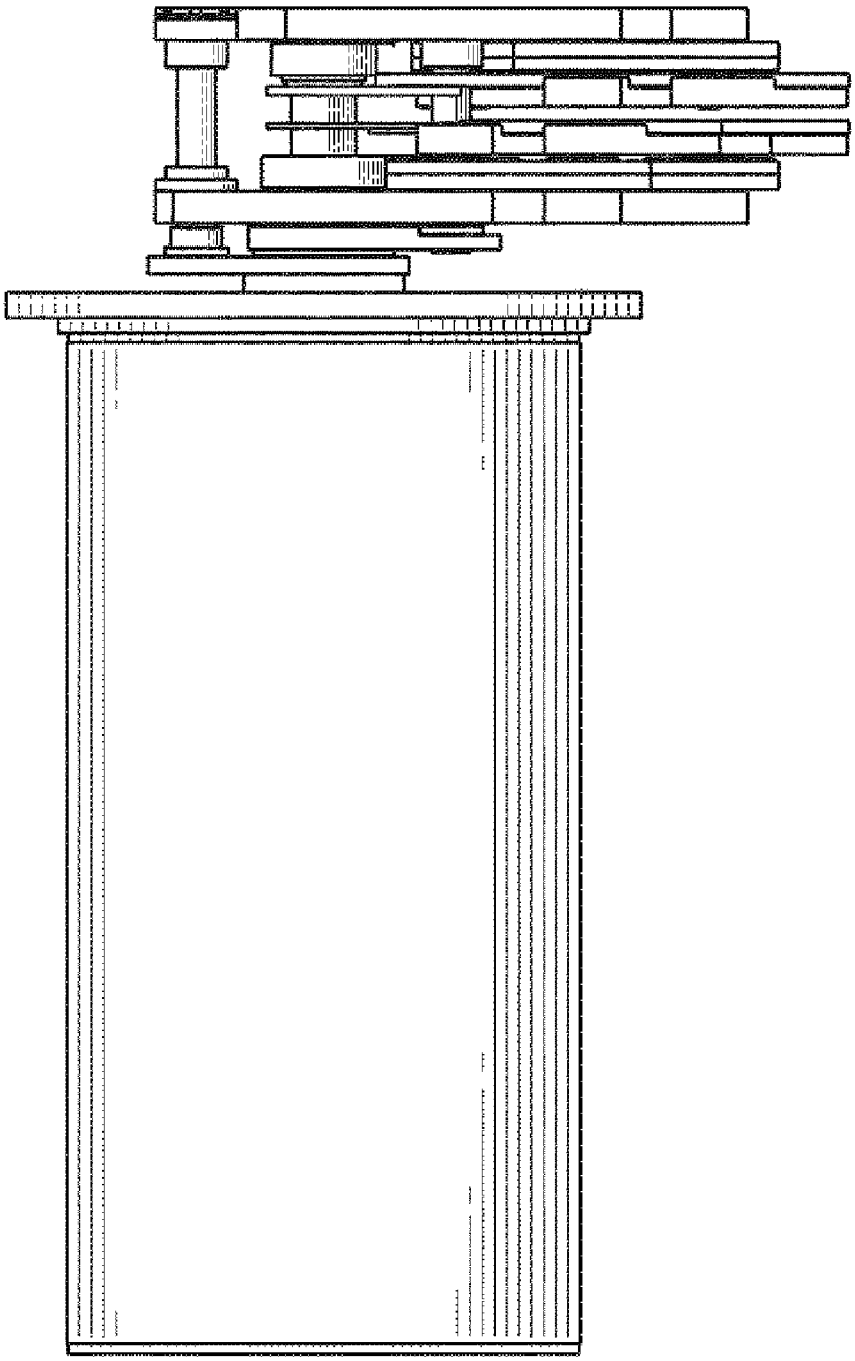
Figure 7:
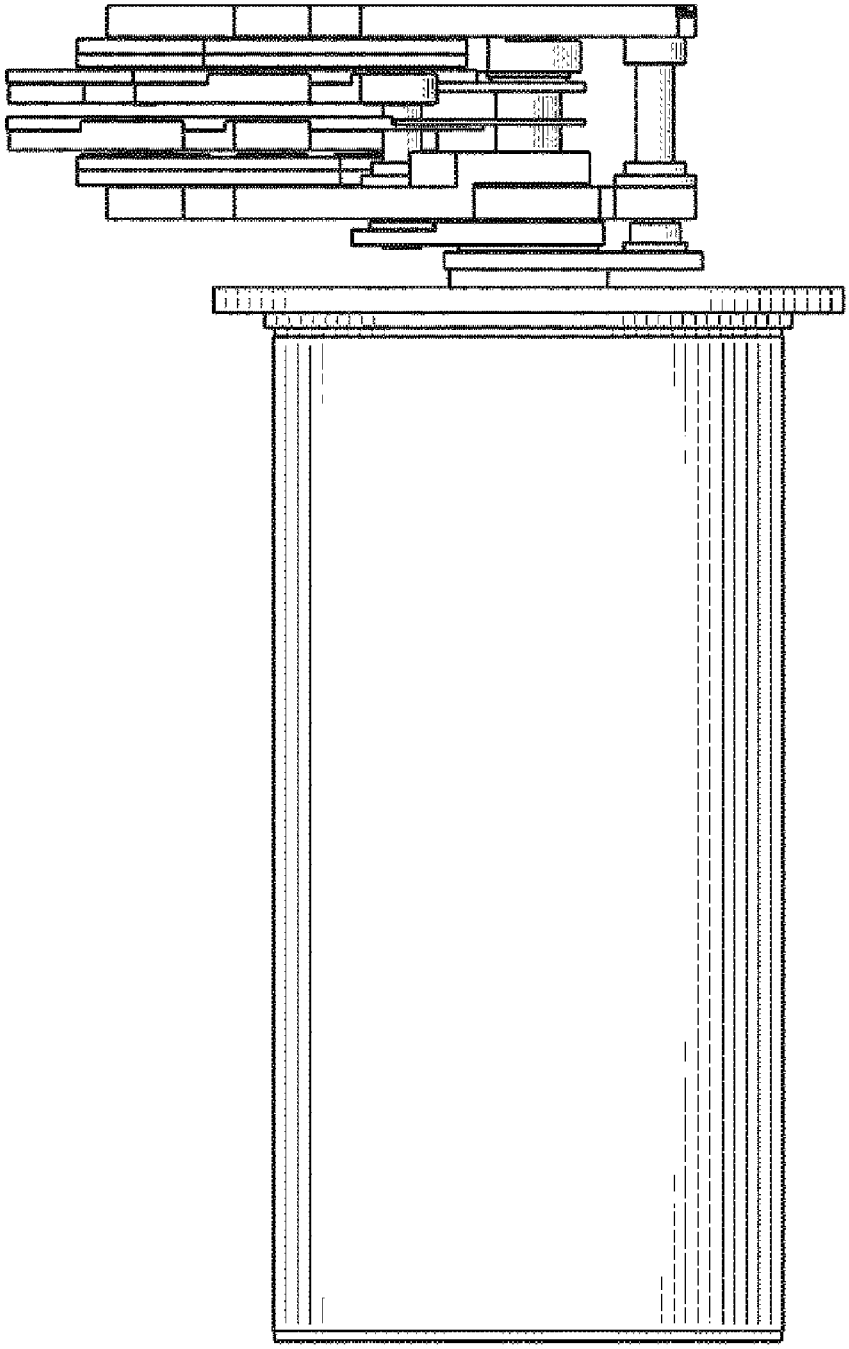
Figure 8:
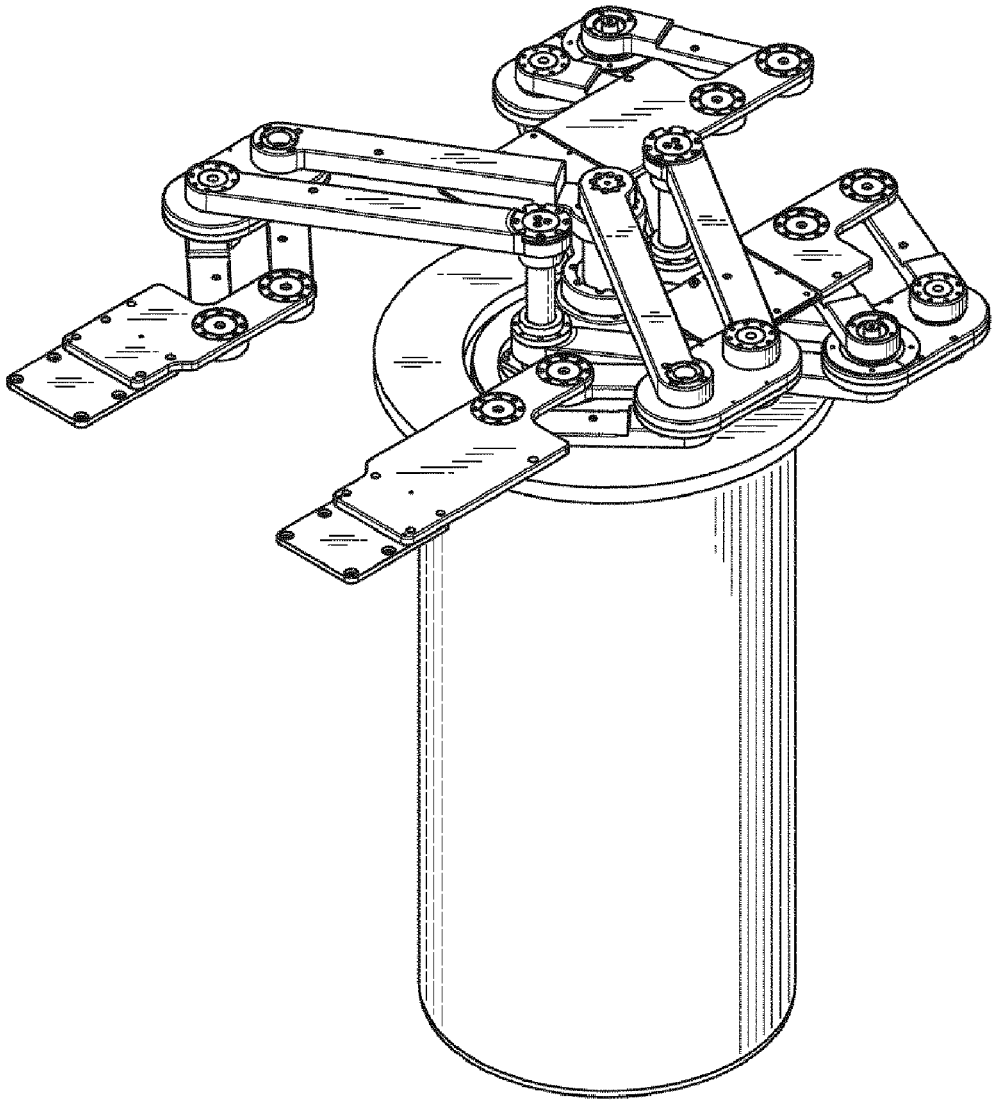
Figure 9:
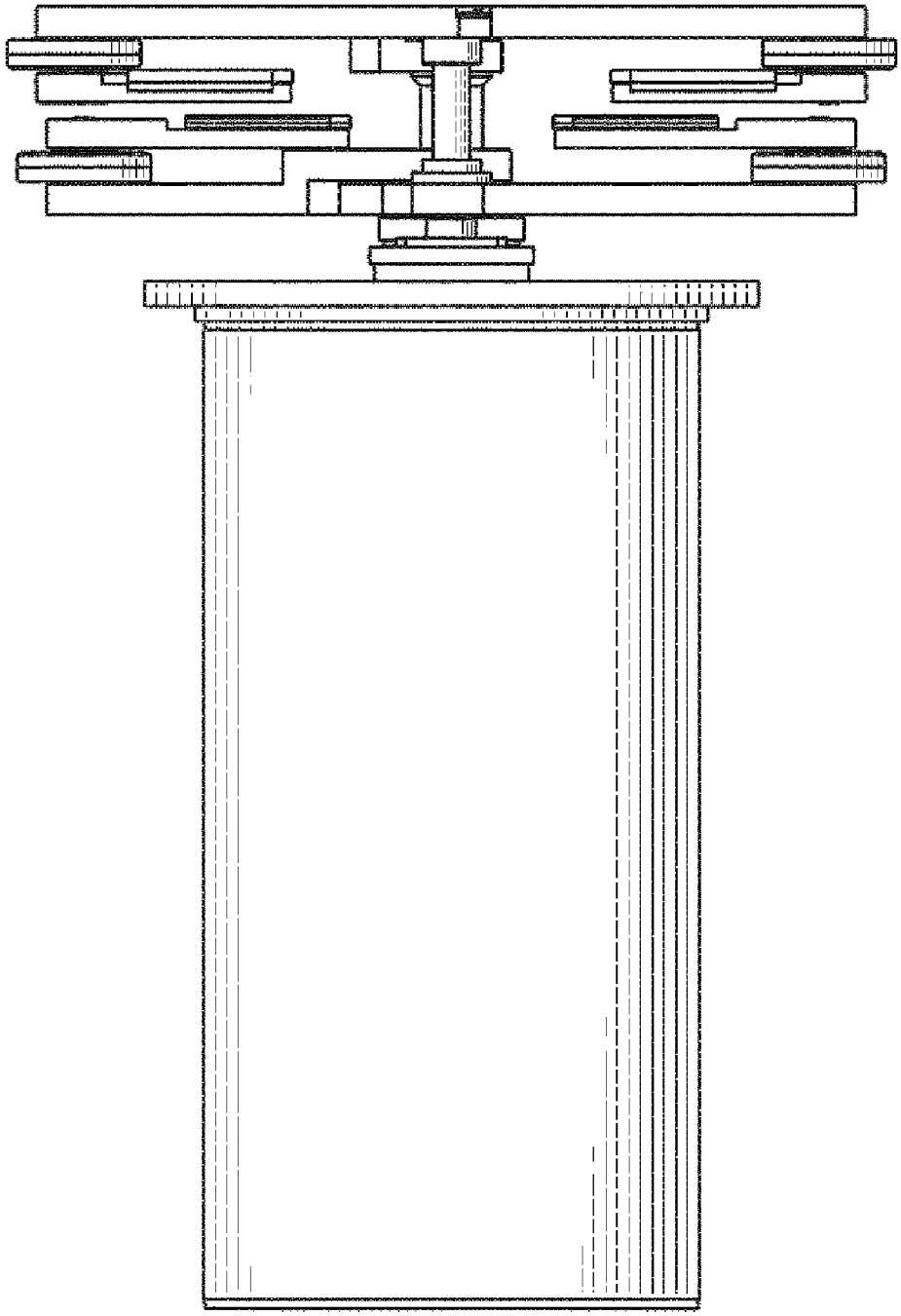
Figure 10:
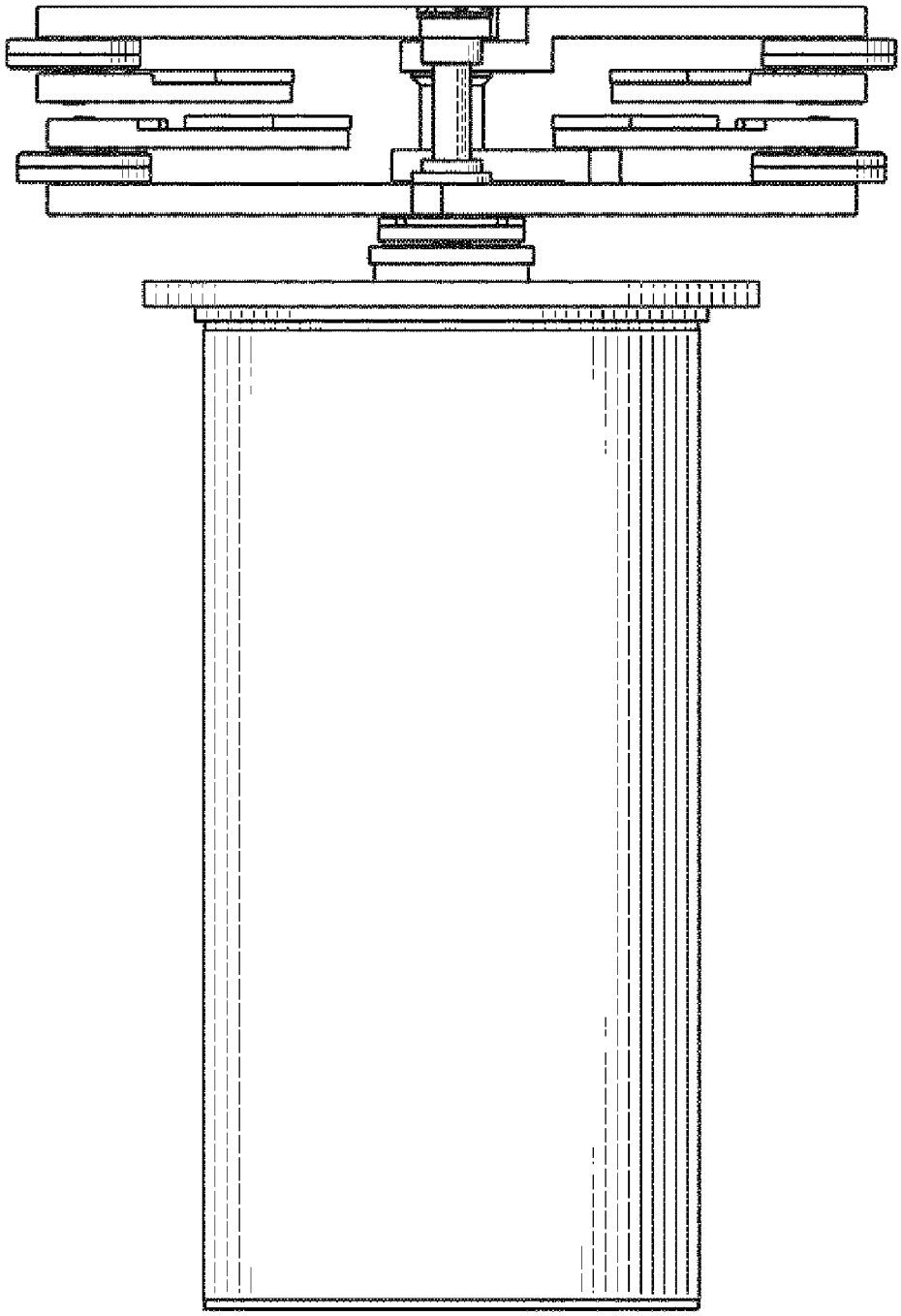
Figure 11:
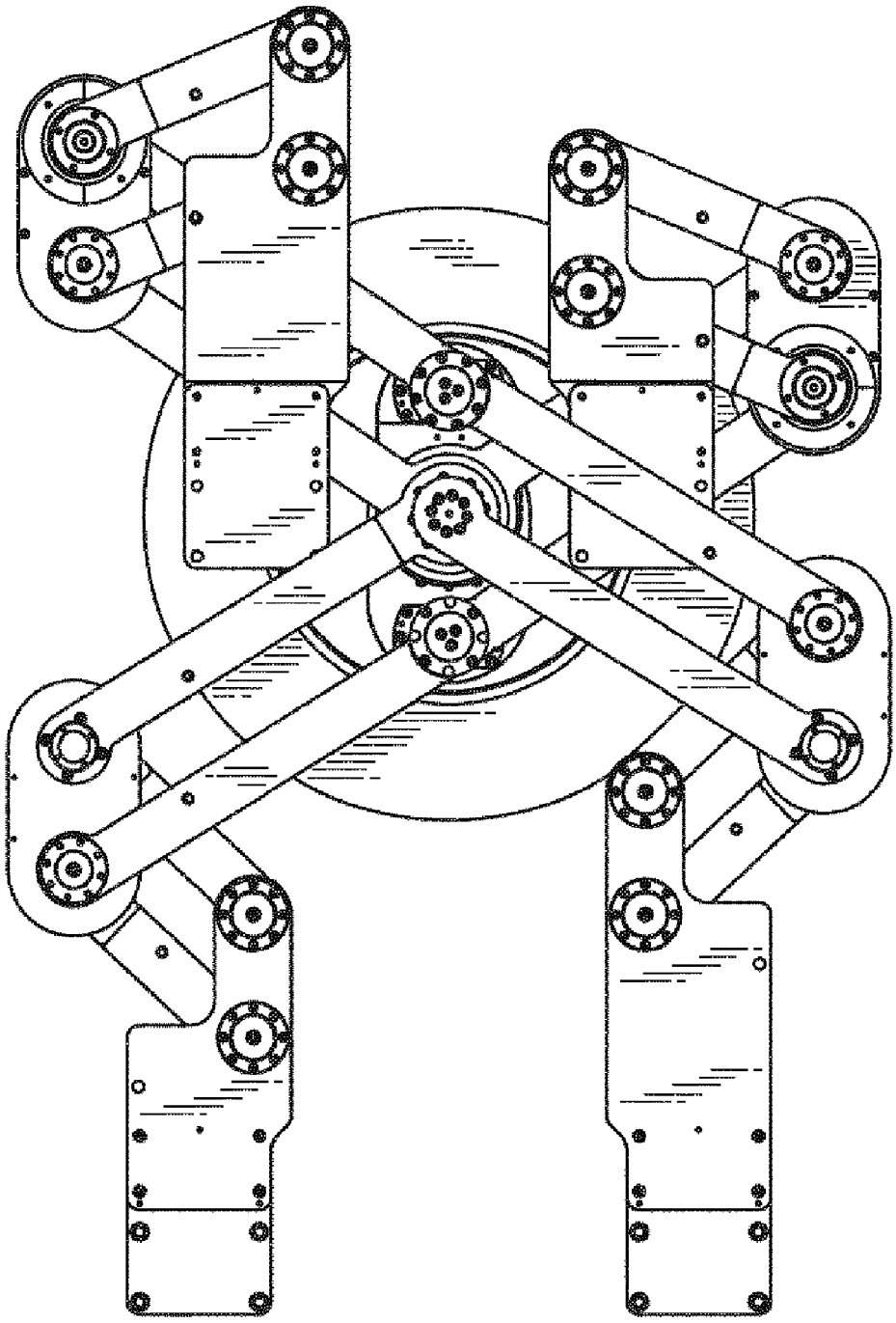
Figure 12:
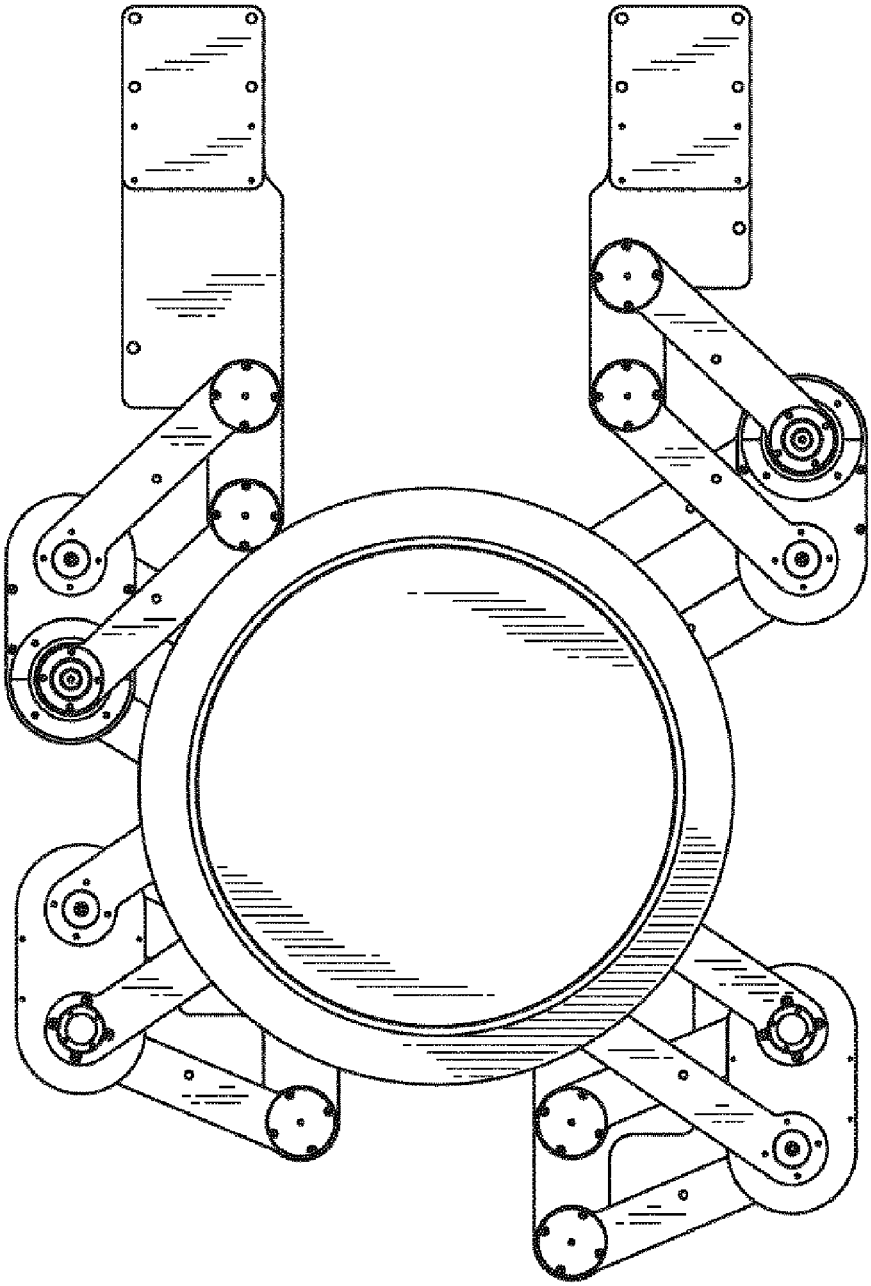
Figure 13:
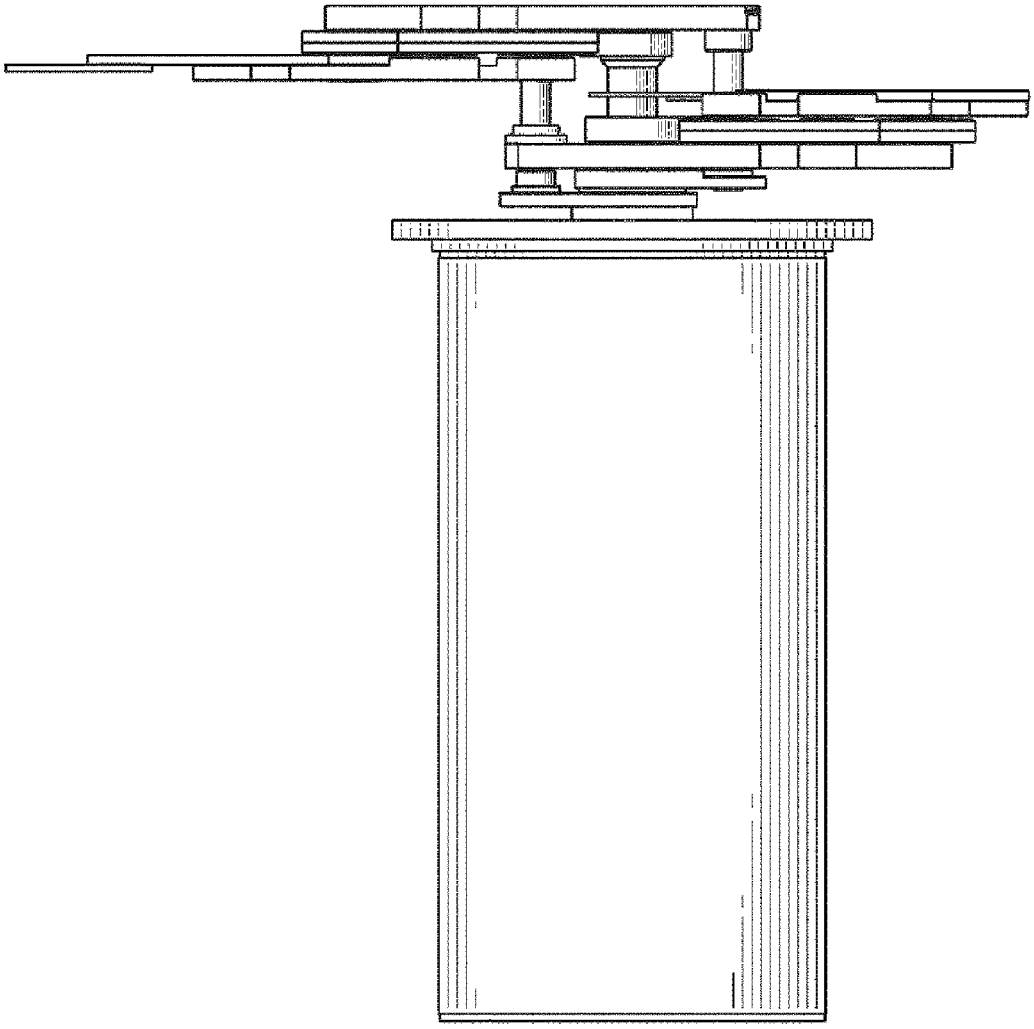
Figure 14:
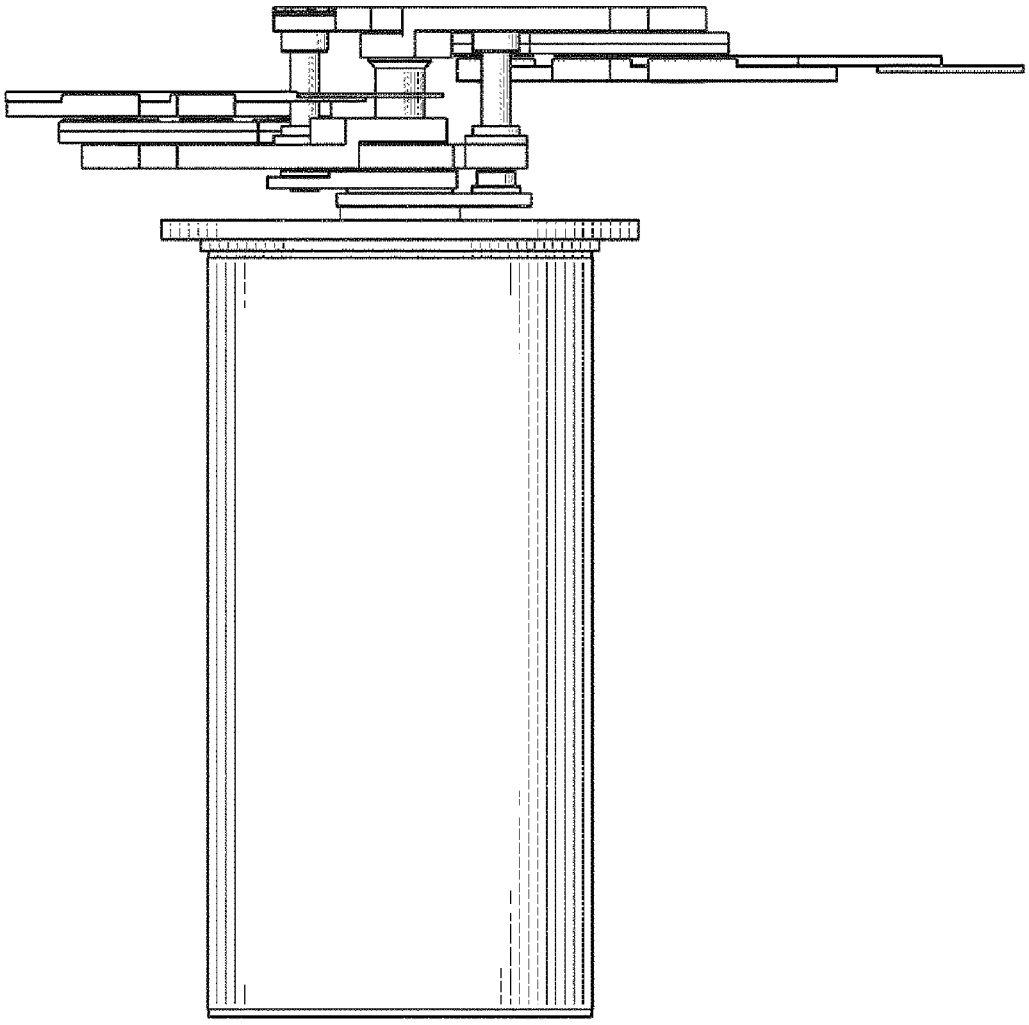

Matter enclosed in heavy brackets [ ] appears in the original patent but forms no part of this reissue; matter printed in italics indicates the additions made by reissue.

U.S. PATENT DOCUMENTS

| | | | | |
|---|---|---|---|---|
| 7,306,423 | B2 * | 12/2007 | Ogawa et al. | 414/749.1 |
| D625,748 | S * | 10/2010 | Yoshino | D15/199 |
| 2002/0114690 | A1 * | 8/2002 | Ishigame | 414/744.5 |
| 2003/0012631 | A1 * | 1/2003 | Pencis et al. | 414/744.5 |
| 2003/0014155 | A1 * | 1/2003 | Pencis et al. | 700/213 |
| 2005/0079043 | A1 * | 4/2005 | Ogawa et al. | 414/744.2 |
| 2005/0118010 | A1 * | 6/2005 | Ogawa et al. | 414/744.1 |
| 2005/0217053 | A1 * | 10/2005 | Kim et al. | 15/250.21 |
| 2007/0004058 | A1 * | 1/2007 | Lee et al. | 438/14 |
| 2007/0183868 | A1 * | 8/2007 | Son | 414/217 |
| 2008/0023293 | A1 * | 1/2008 | Uratani et al. | 198/346.2 |
| 2008/0118338 | A1 * | 5/2008 | Huang et al. | 414/744.3 |
| 2009/0093906 | A1 * | 4/2009 | Takizawa et al. | 700/214 |
| 2009/0142163 | A1 * | 6/2009 | Genetti et al. | 414/217 |
| 2010/0101357 | A1 * | 4/2010 | Aoki et al. | 74/490.05 |
| 2010/0161124 | A1 * | 6/2010 | Kimura | 700/251 |

* cited by examiner